Patented June 9, 1925.

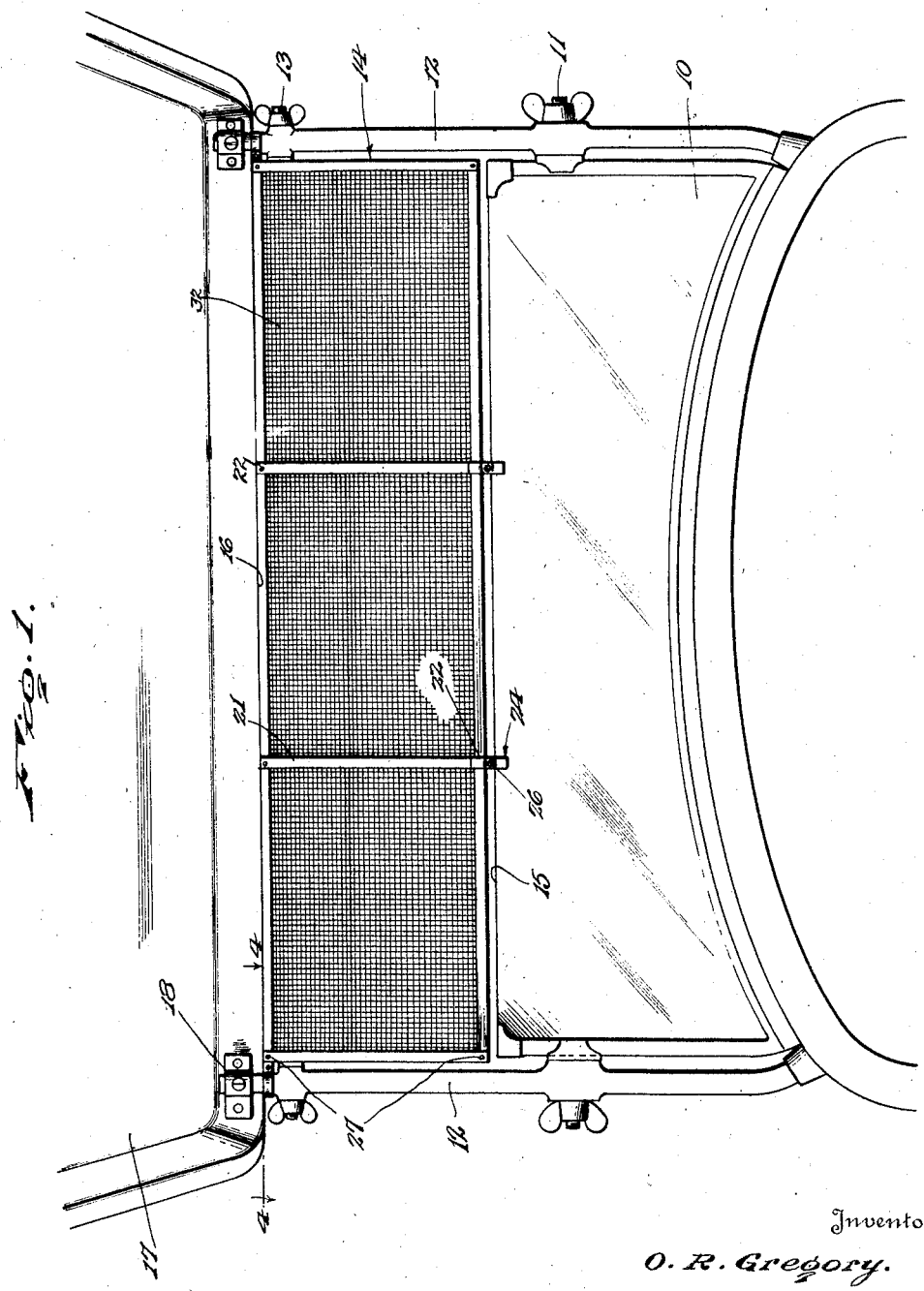

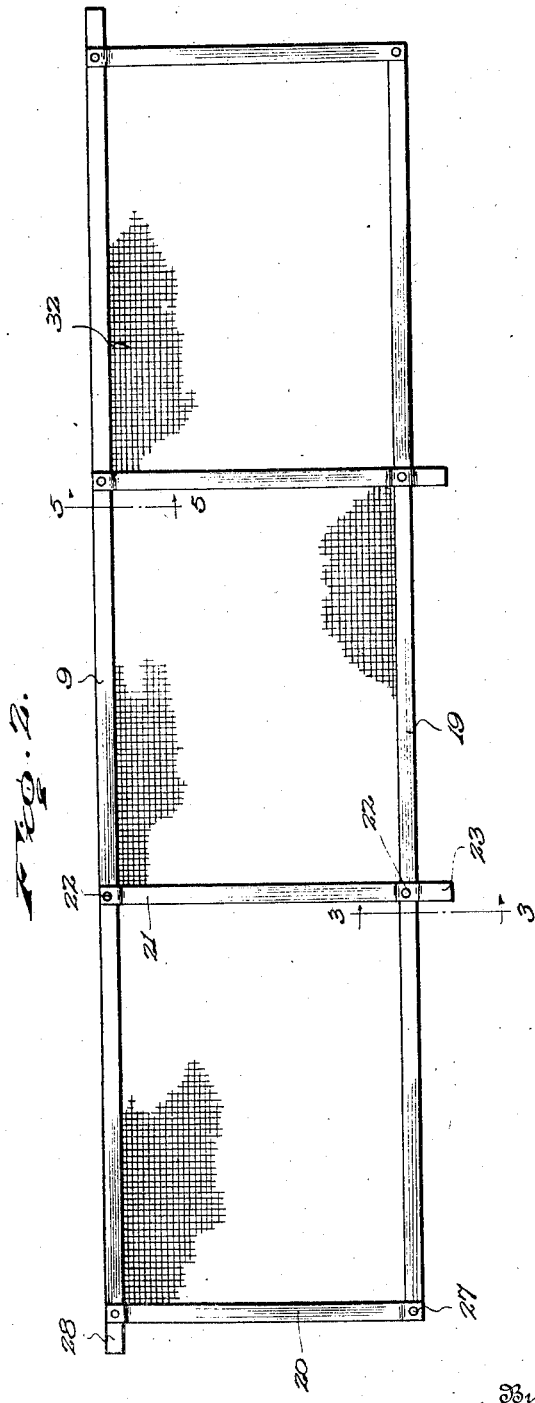

1,540,985

UNITED STATES PATENT OFFICE.

OTHO R. GREGORY, OF WINTER GARDEN, FLORIDA.

WINDSHIELD SCREEN.

Application filed December 6, 1923. Serial No. 678,996.

*To all whom it may concern:*

Be it known that OTHO R. GREGORY, a citizen of the United States, residing at Winter Garden, in the county of Orange and State of Florida, have invented certain new and useful Improvements in Windshield Screens, of which the following is a specification.

My invention relates to screens for automobiles, intended to occupy the space between the wind shields when they are open, but the screens may also be applied to the side and door windows in closed automobiles.

The main object of the invention is to screen the window and wind shield openings to prevent insects from entering an automobile and also keep dust out as much as possible.

In the accompanying drawings, one embodiment of the invention is illustrated, and—

Figure 1 is a fragmentary view of the wind shields as seen from the inside of an automobile with the screen positioned in the opening formed when the upper wind shield is swung open;

Figure 2 is a front elevation of the screen;

Figure 3 is a fragmentary vertical section along line 3—3 of Figure 2;

Figure 4 is a horizontal section along line 4—4 of Figure 1, and

Figure 5 is a vertical section along line 5—5 of Figure 2.

In the drawings, the reference numeral 10 represents the lower wind shield pivoted, as at 11, between the standards 12 on either side of the dash board of an automobile. The upper wind shield is pivoted between the standards, as at 13, and the screen 14 is inserted in the rectangular opening formed between the top edge 15 of the lower wind shield 10 and the bottom edge 16 of the automobile top 17, the latter being secured in the usual manner, as at 18, to the standards 12.

The screen consists of a frame having an upper longitudinal channel 9 and a lower one 19 connected by upright channels 20 at each end thereof. The frame is divided into a suitable number of sections, three being shown in the drawings, by intermediary uprights 21 which are preferably made from metallic band and riveted to the longitudinal channels 9 and 19, as at 22. The intermediary uprights 21 are continued below the bottom channel 19 and brought together around the channel, as at 23 in Figure 3, in order to engage in clips 24. The clips 24 consist of short pieces of metallic band having downwardly extending fingers 25 adapted to engage the top edge 15 of the lower wind shield 10, as best seen in Figs. 1 and 3, while they are crimped tightly together by central bolts 26. The upright channels 20 are also riveted to the ends of the upper and lower longitudinal channels 9 and 19, as at 27, and the ends of the upper channel 9 extend beyond the outer sides of the upright channels 20 forming fingers 28. The fingers 28 engage in clips 29 which are clamped with their jaws 30 around the upper ends of the standards 12 close under the bottom edge 16 of the automobile top, see Figs. 1 and 4. The clips are held together by bolts 31 which simultaneously clamp the clips to the standards 12 and to the fingers 28.

In the frame 14 is stretched a metallic mesh 32 held rigidly therein by crimping the flanges of the channels along the edges of the mesh. The mesh is fine enough to prevent small insects such as mosquitoes and gnats from passing through the same and also practically to exclude dust.

The frame is mounted in the wind shield opening in such a manner that the upper wind shield may be closed over the same without removing the frame.

When using the screen for doors and windows of closed cars such as sedans, coupés and the like, the fastening means or clips may have to be modified somewhat.

Having thus described the invention, what is claimed as new is:

1. A screen of the class described comprising a frame and a metallic mesh, the said frame including side, top and bottom members of channel cross section having flanges tightly engaging with their entire inner surface the edges of the metallic mesh, intermediary uprights connecting the top and bottom channel members, the top member and intermediary uprights having fingers extending beyond the outer edges of the frame, and clamping means for securing the frame in a window opening, said clamping means being adapted to simultaneously grip the fingers and the sides of the window opening.

2. The combination with an automobile wind shield having standards in which the top and bottom wind shields are pivoted, of a screen comprising a frame having flat flanges and horizontally and vertically projecting fingers, clamping members including double jaws engaging the standards and bottom wind shield respectively on the one hand and said fingers on the other hand and tightening bolts for the jaws, and a metallic mesh held firmly within the frame between the front inner surfaces of the flanges.

In testimony whereof I affix my signature.

OTHO R. GREGORY. [L. S.]